(12) United States Patent
Ko et al.

(10) Patent No.: US 10,756,380 B2
(45) Date of Patent: Aug. 25, 2020

(54) ELECTRODE ASSEMBLY AND METHOD OF MANUFACTURING THE SAME

(71) Applicant: LG CHEM, LTD., Seoul (KR)

(72) Inventors: Myung Hoon Ko, Daejeon (KR); Ji Won Park, Daejeon (KR); Seung Ho Na, Daejeon (KR); Jin Ho Ban, Daejeon (KR); Ah Reum Jung, Daejeon (KR)

(73) Assignee: LG Chem, Ltd. (KR)

( * ) Notice: Subject to any disclaimer, the term of this patent is extended or adjusted under 35 U.S.C. 154(b) by 176 days.

(21) Appl. No.: 15/980,050

(22) Filed: May 15, 2018

(65) Prior Publication Data
US 2018/0261874 A1 Sep. 13, 2018

Related U.S. Application Data

(63) Continuation of application No. 14/415,121, filed as application No. PCT/KR2014/001269 on Feb. 17, 2014, now Pat. No. 10,090,553.

(30) Foreign Application Priority Data

Feb. 15, 2013 (KR) .................. 10-2013-0016513
Feb. 17, 2014 (KR) .................. 10-2014-0017702

(51) Int. Cl.
*H01M 10/04* (2006.01)
*H01M 10/0585* (2010.01)

(52) U.S. Cl.
CPC ... *H01M 10/0468* (2013.01); *H01M 10/0413* (2013.01); *H01M 10/0459* (2013.01); *H01M 10/0585* (2013.01); *Y10T 29/49114* (2015.01)

(58) Field of Classification Search
CPC ......... H01M 10/0413; H01M 10/0459; H01M 10/0468; H01M 10/0585; Y10T 29/49114
See application file for complete search history.

(56) References Cited

U.S. PATENT DOCUMENTS 7,384,705 B2   6/2008 Kezuka et al.
2002/0160257 A1* 10/2002 Lee .................. H01M 6/46
429/130

(Continued)

FOREIGN PATENT DOCUMENTS

CN   1363121 A   8/2002
JP   2009-522744 A   6/2009

(Continued)

OTHER PUBLICATIONS

Machine translation of KR 20030066960 (Year: 2003).*

(Continued)

*Primary Examiner* — Lingwen R Zeng
(74) *Attorney, Agent, or Firm* — Lerner, David, Littenberg, Krumholz & Mentlik, LLP

(57) ABSTRACT

An electrode assembly includes a cell stack part having (a) a structure in which one kind of radical unit is repeatedly disposed, or (b) a structure in which at least two kinds of radical units are disposed in a predetermined order, the one kind or the at least two kinds of radical units having same number of electrodes and separators alternately disposed. The one kind of radical unit has four-layered structure in which first electrode, first separator, second electrode and second separator are sequentially stacked or repeating structure of the four-layered structure. Each of the at least two kinds of radical units are stacked by ones to form the four-layered structure or the repeating structure. An outer separator that is a separator among separators of a radical unit positioned at the outermost part of the cell stack part is extended from a side of the cell stack part.

27 Claims, 25 Drawing Sheets

(56) References Cited

U.S. PATENT DOCUMENTS

| | | |
|---|---|---|
| 2002/0160258 A1 | 10/2002 | Lee et al. |
| 2006/0046149 A1 | 3/2006 | Yong et al. |
| 2006/0115718 A1 | 6/2006 | Parsian et al. |
| 2006/0251962 A1 | 11/2006 | Kim |
| 2007/0154790 A1 | 7/2007 | Jeung et al. |
| 2007/0254199 A1 | 11/2007 | Shu et al. |
| 2008/0044689 A1 | 2/2008 | Shu et al. |
| 2008/0102354 A1 | 5/2008 | Lee |
| 2009/0291360 A1 | 11/2009 | Kim et al. |
| 2010/0190081 A1* | 7/2010 | Park ............... H01M 2/206 429/452 |
| 2010/0261047 A1 | 10/2010 | Kim et al. |
| 2011/0045338 A1* | 2/2011 | Bae ............... H01M 2/1646 429/144 |
| 2011/0052964 A1 | 3/2011 | Kim et al. |
| 2011/0244304 A1* | 10/2011 | Shinyashiki ........ H01M 2/16 429/139 |
| 2011/0281172 A1 | 11/2011 | Yong et al. |
| 2012/0196167 A1 | 8/2012 | Kim et al. |
| 2012/0225345 A1 | 9/2012 | Kim |
| 2013/0183570 A1 | 7/2013 | Yong et al. |
| 2013/0209861 A1 | 8/2013 | Yong et al. |
| 2014/0050957 A1 | 2/2014 | Yang |
| 2014/0134472 A1 | 5/2014 | Kim |
| 2014/0154565 A1 | 6/2014 | Ku et al. |

FOREIGN PATENT DOCUMENTS

| | | |
|---|---|---|
| JP | 2010-525542 A | 7/2010 |
| JP | 2013-524460 A | 6/2013 |
| JP | 2013-182819 A | 9/2013 |
| JP | 2014-534599 A | 12/2014 |
| JP | 2015-503832 A | 2/2015 |
| KR | 10-2003-0066960 A | 8/2003 |
| KR | 20030066960 A * | 8/2003 |
| KR | 10-2004-0082874 A | 9/2004 |
| KR | 10-2008-0005629 A | 1/2008 |
| KR | 10-2011-0037781 A | 4/2011 |
| KR | 10-2011-0112241 A | 10/2011 |
| TW | 499767 B | 8/2002 |
| TW | 200743245 A | 11/2007 |
| TW | 200812138 A | 3/2008 |
| TW | I344234 B | 6/2011 |
| WO | WO 2006/025662 A1 | 3/2006 |
| WO | WO 2008/002024 A1 | 1/2008 |

OTHER PUBLICATIONS

International Search Report issued in PCT/KR2014/001269, dated Jun. 9, 2014.
Extended European Search Report, dated Sep. 22, 2015, for European Application No. 14751822.9.
Machine translation of KR 10-2003-0066960-A.

* cited by examiner

ELECTRODE ASSEMBLY AND METHOD OF MANUFACTURING THE SAME

CROSS-REFERENCE TO RELATED APPLICATIONS

This application is a Continuation of copending U.S. application Ser. No. 14/415,121, filed on Jan. 15, 2015, which is the National Phase under 35 U.S.C. § 371 of International Application No. PCT/KR2014/001269, filed on Feb. 17, 2014, which claims priority under 35 U.S.C. § 119(a) to Application Nos. 10-2014-0017702 and 10-2013-0016513, filed in the Republic of Korea on Feb. 17, 2014 and Feb. 15, 2013 respectively, all of which are hereby expressly incorporated by reference into the present application.

TECHNICAL FIELD

The present invention relates to an electrode assembly and a method of manufacturing the same, and more particularly, to an electrode assembly manufactured by a stacking method, wherein a bottom separator is wound around a radical unit, and a method of manufacturing the same.

BACKGROUND ART

Secondary batteries may be classified into various types according to the structure of an electrode assembly. Typically, secondary batteries may be classified into a stack-type, a wrapping-type (a jelly-roll type), or a stack/folding type according to the structure of an electrode assembly. The stack-type structure may be obtained by separately stacking electrode units (a cathode, a separator, and an anode) constituting the electrode assembly, and thus an accurate alignment of the electrode assembly is very difficult. In addition, a large number of processes are necessary for the manufacture of the electrode assembly. The stack/folding type structure is generally manufactured by using two lamination apparatuses and one folding apparatus, and thus the manufacture of the electrode assembly is very complicated. Particularly, in the stack/folding type structure, full cells or hi-cells are stacked through folding, and thus the alignment of the full cells or the hi-cells is difficult.

In addition, since the separator may be wound may times by folding, wetting properties of an electrode assembly may be deteriorated.

DISCLOSURE OF THE INVENTION

Technical Problem

An aspect of the present disclosure provides an electrode assembly manufactured by a stacking method, in which a bottom separator is wound around a radical unit, thereby improving wetting properties, simplifying manufacturing processes and decreasing production cost.

Technical Solution

According to an aspect of the present disclosure, there is provided an electrode assembly including a cell stack part having (a) a structure in which one kind of radical unit is repeatedly disposed, the one kind of radical unit having same number of electrodes and separators which are alternately disposed, or (b) a structure in which at least two kinds of radical units are disposed in a predetermined order, the at least two kinds of radical units each having same number of electrodes and separators which are alternately disposed. The one kind of radical unit of (a) has a four-layered structure in which a first electrode, a first separator, a second electrode and a second separator are sequentially stacked or a structure in which the four layered structures are repeatedly stacked, and each of the at least two kinds of radical units of (b) are stacked by ones in the predetermined order to form the four-layered structure or the structure in which the four-layered structures are repeatedly stacked. In addition, an outer separator that is a separator among separators of a radical unit positioned at an outermost part of the cell stack part is longer than a side of the cell stack part.

According to another aspect of the present disclosure, there is provided a method of manufacturing an electrode assembly including a first step of forming one kind of a radical unit having an alternately stacked structure of same number of electrodes and separators, or at least two kinds of radical units having an alternately stacked structure of same number of electrodes and separators, wherein an outer separator that is a separator among separators of an outer radical unit positioned at an outermost part of the cell stack part is longer than remaining separators; a second step of forming a cell stack part by repeatedly stacking the one kind of the radical units, or by stacking the at least two kinds of the radical units in a predetermined order, wherein the outer radical unit is stacked at the outermost part of the cell stack part; and a third step of winding and fixing the outer separator of the outer radical unit around the cell stack part. The one kind of radical unit has a four-layered structure in which a first electrode, a first separator, a second electrode and a second separator are sequentially stacked or a structure in which the four layered structures are repeatedly stacked, and each of the at least two kinds of radical units are stacked by ones in the predetermined order to form the four-layered structure or the structure in which the four-layered structures are repeatedly stacked.

Advantageous Effects

According to the present disclosure, a second separator is formed long, cut and finished while winding around the radical unit in an electrode assembly to improve wetting properties when compared to a common folding structure and to improve commercial value of a secondary battery. At the same time, a separate process using a taping apparatus may be omitted, and manufacturing processes may be simplified and production cost may be decreased.

MODE FOR CARRYING OUT THE INVENTION

Exemplary embodiments of the present disclosure will now be described in detail with reference to the accompanying drawings. However, the present disclosure is not restricted or limited to the following exemplary embodiments.

Cell Stack Part

The cell stack part has a structure obtained by repeatedly disposing one kind of radical units or a structure obtained by disposing at least two kinds of radical units in a predetermined order, for example, alternately. This will be described below in more detail.

[Structure of Radical Unit]

Figure 1:
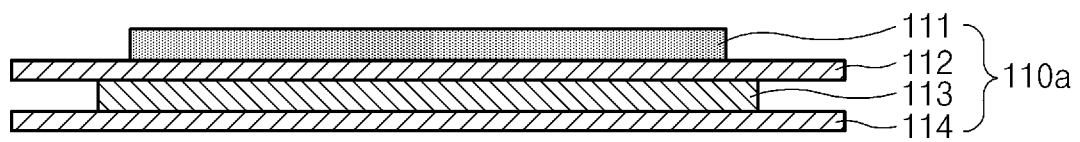
FIG. 1 is a side view illustrating a first structure of a radical unit according to the present disclosure.

In an electrode assembly according to the present disclosure, a radical unit is formed by alternately disposing electrodes and separators. Here, the same number of electrodes and separators are disposed. For example, as illustrated in FIG. 1 a radical unit 110a may be formed by stacking two electrodes 111 and 113 and two separators 112 and 114. Here, a cathode and an anode may naturally face each other through the separator. When the radical unit is formed as described above, an electrode 111 is positioned at one end of the radical unit (see the electrode 111 in FIGS. 1 and 2) and a separator 114 is positioned at the other end of the radical unit (see the separator 114 in FIGS. 1 and 2).

The electrode assembly according to the present disclosure is basically characterized in that the cell stack part or electrode assembly is formed by only stacking the radical units. That is, the present disclosure has a basic characteristic in that the cell stack part is formed by repeatedly stacking one kind of radical unit or by stacking at least two kinds of radical unit in a predetermined order. To realize the above-described characteristic, the radical unit may have the following structure.

Figure 2:
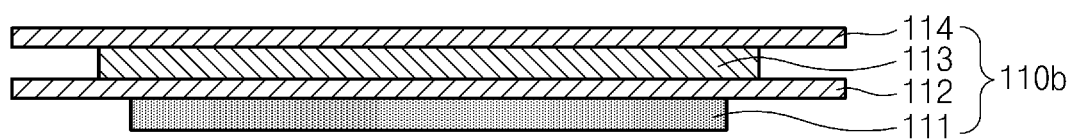
FIG. 2 is a side view illustrating a second structure of a radical unit according to the present disclosure.

First, the radical unit may be formed by stacking a first electrode, a first separator, a second electrode, and a second separator in sequence. In more detail, a first electrode 111, a first separator 112, a second electrode 113, and a second separator 114 may be stacked in sequence from an upper side to a lower side, as illustrated in FIG. 1, or from the lower side to the upper side, as illustrated in FIG. 2, to form radical units 110a and 110b. The radical unit having the above-described structure may be referred to as a first radical unit. Here, the first electrode 111 and the second electrode 113 may be opposite types of electrodes. For example, when the first electrode 111 is a cathode, the second electrode 113 may be an anode.

Figure 3:
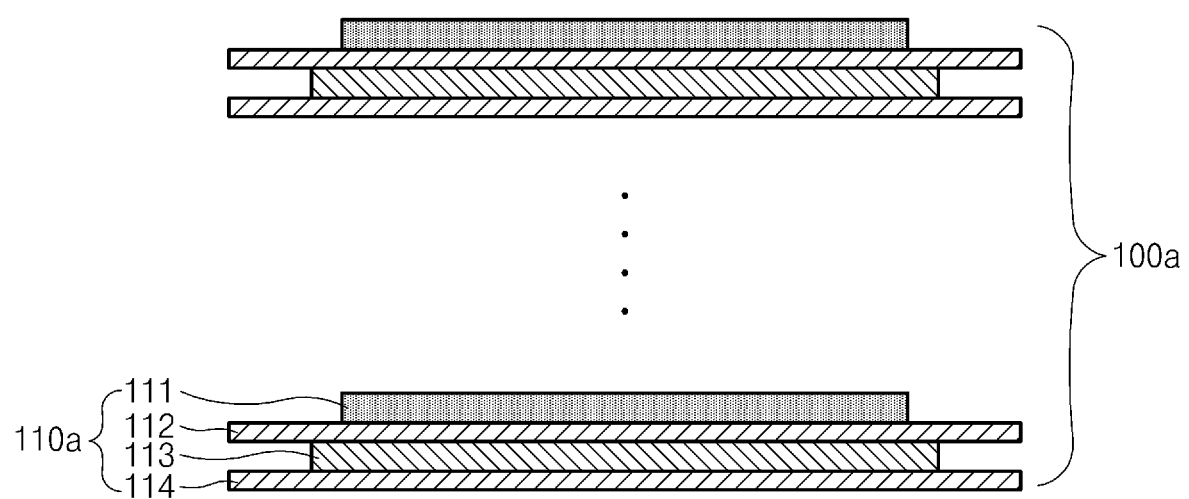
FIG. 3 is a side view illustrating a cell stack part formed by stacking the radical units of FIG. 1.

As described above, when the radical unit is formed by stacking the first electrode 111, the first separator 112, the second electrode 113, and the second separator 114 in sequence, a cell stack part 100a may be formed by only repeatedly stacking the one kind of radical units 110a, as illustrated in FIG. 3. Here, the radical unit may have an eight-layered structure or twelve-layered structure in addition to a tour-layered structure. That is, the radical unit may have a repeating structure in which the four-layered structure is repeatedly disposed. For example, the radical unit may be formed by stacking the first electrode 111, the first separator 112, the second electrode 113, the second separator 114, the first electrode 111, the first separator 112, the second electrode 113, and the second separator 114 in sequence.

Alternatively, the radical unit may be formed by stacking the first electrode 111, the first separator 112, the second electrode 113, the second separator 114, the first electrode 111, and the first separator 112 in sequence, or by stacking the second electrode 113, the second separator 114, the first electrode 111, the first separator 112, the second electrode 113, and the second separator 114 in sequence. The radical unit having the former structure may be referred to as a second radical unit and the radical unit having the latter structure may be referred to as a third radical unit.

Figure 4:
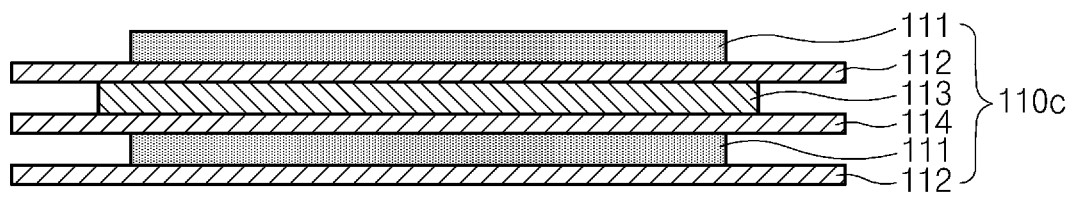
FIG. 4 is a side view illustrating a third structure of a radical unit according to the present disclosure.
Figure 5:
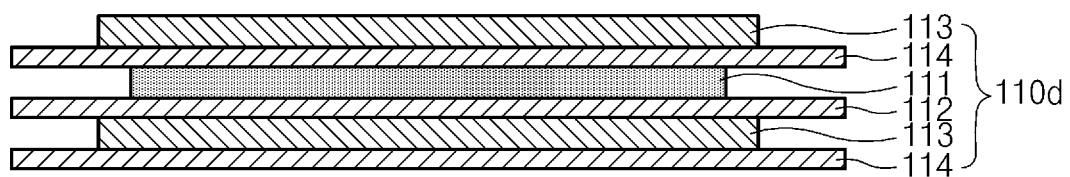
FIG. 5 is a side view illustrating a fourth structure of a radical unit according to the present disclosure.

In more detail, the second radical unit 100c may be formed by stacking the first electrode 111, the first separator 112, the second electrode 113, the second separator 114, the first electrode 111, and the first separator 112 in sequence from the upper side to the lower side, as illustrated in FIG. 4. Also, the third radical structure 110d may be formed by stacking the second electrode 113, the second separator 114, the first electrode 111, the first separator 112, the second electrode 113, and the second separator 114 in sequence from the upper side to the lower side, as illustrated in FIG. 5. As noted above, the stacking may be conducted in sequence from the lower side to the upper side.

Figure 6:
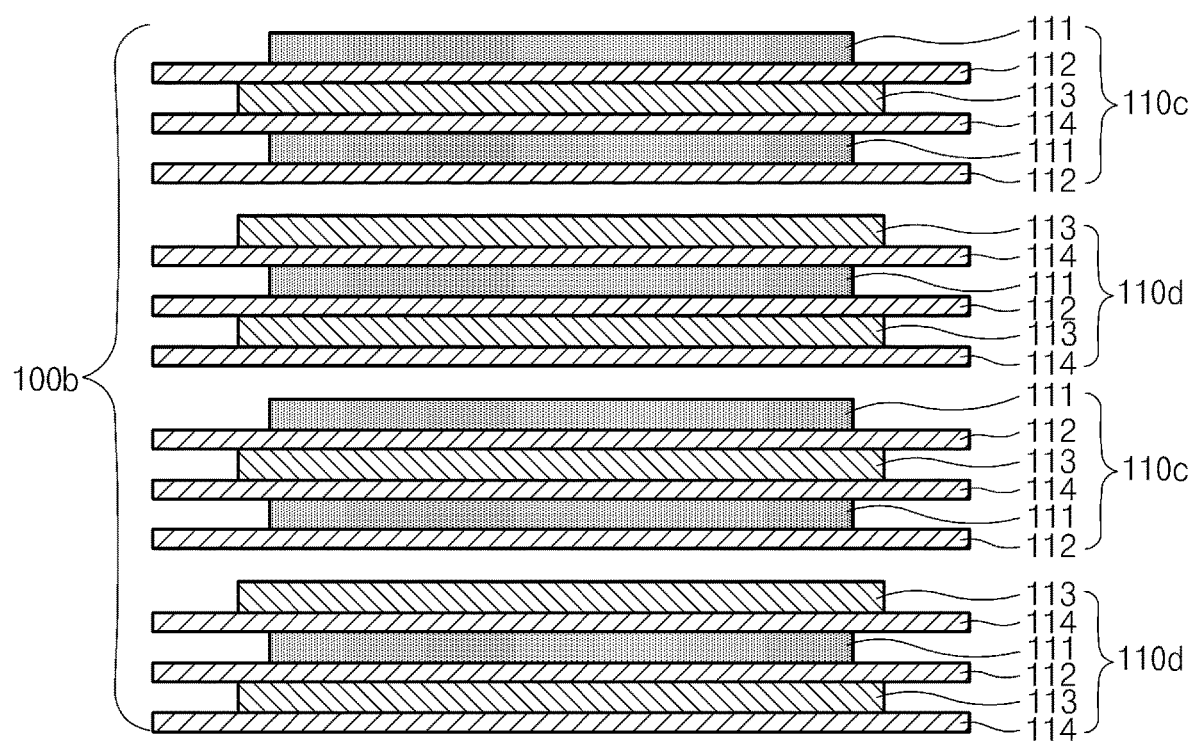
FIG. 6 is a side view illustrating a cell stack part formed by stacking the radical units of FIG. 4 and the radical units of FIG. 5.

When only one of the second radical units 110c and one of the third radical units 110d are stacked, a repeating structure in which the four-layered structure is repeatedly stacked may be formed. Thus, when the second radical unit 110c and the third radical unit 110d are alternately stacked one by one, the cell stack part 100b may be formed by stacking only the second and third radical units, as illustrated in FIG. 6. For reference, when three kinds of radical units are prepared, the cell stack part may be formed by stacking the radical units in a predetermined order, for example, the first radical unit, the second radical unit, the third radical unit, the first radical unit again, the second radical unit, and the third radical unit.

As described above, the one kind of radical unit in the present disclosure has a four-layered structure in which a first electrode, a first separator, a second electrode and a second separator are sequentially stacked, or has a repeating structure in which the four-layered structure is repeatedly stacked. Also, at least two kinds of radical units in the present disclosure are stacked only by ones in a predetermined order to form the four-layered structure or the repeating structure in which the four-layered structure is repeatedly disposed. For example, the first radical unit forms a four layered structure by itself, and the second radical unit and the third radical unit form a twelve-layered structure by stacking one of each, that is, two radical units in total.

Thus, the cell stack part or electrode assembly may be formed only by stacking, that is, by repeatedly stacking one kind of radical unit or by stacking at least two kinds of radical units in a predetermined order.

The cell stack part of the present disclosure may be formed by stacking the radical units one by one. That is, the cell stack part may be manufactured by forming the radical units and then stacking the radical units repeatedly or in a predetermined order. As described above, the cell stack part of the present disclosure may be formed by only stacking the radical units. Therefore, the radical units of the present disclosure may be very accurately aligned. When the radical unit is accurately aligned, the electrode and the separator may also be accurately aligned in the cell stack part. In addition, the cell stack part or electrode assembly may be improved in productivity. This is done because the manufacturing process is very simple.

[Manufacture of Radical Unit]

Figure 7:
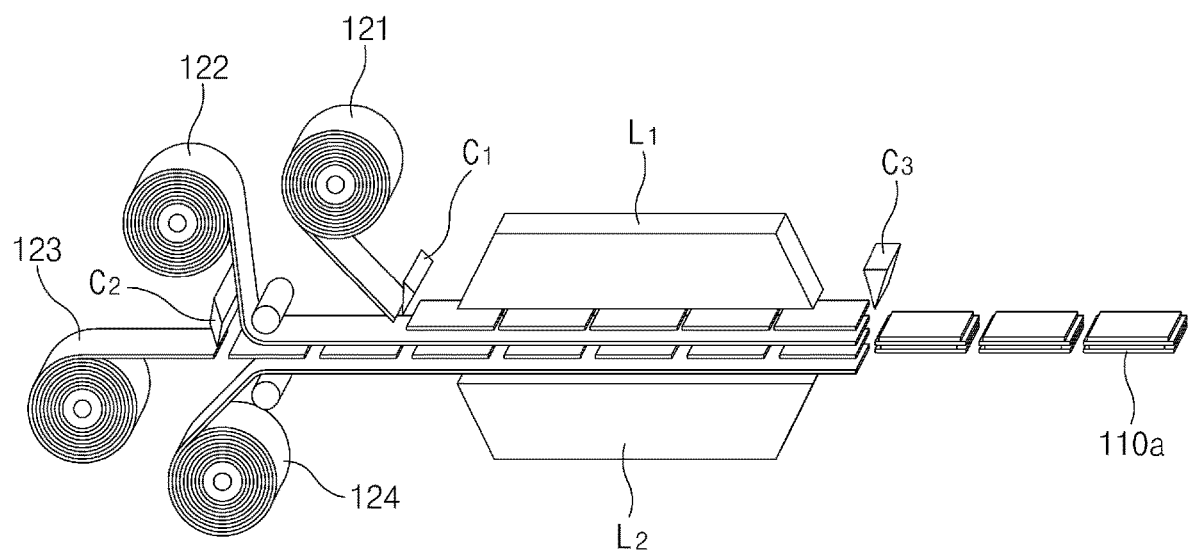
FIG. 7 is a process diagram illustrating a manufacturing process of a radical unit according to the present disclosure.

A manufacturing process of the first radical unit will be exemplarily described with reference to FIG. 7. First, a first electrode material 121, a first separator material 122, a second electrode material 123 and a second separator material 124 are prepared. Here, the first separator material 122 and the second separator material 124 may be the same. The first electrode material 121 is cut into a certain size through a cutter C1, and the second electrode material 123 is cut into a certain size through a cutter C2. Then, the first electrode material 121 is stacked on the first separator material 122, and the second electrode material 123 is stacked on the second separator material 124.

Then, it is preferable that the electrode materials and the separator materials are attached to each other through laminators L1 and L2. Through the attachment, a radical unit in which the electrodes and the separators are integrally combined may be formed. The combining method may be diverse. The laminators L1 and L2 may apply pressure to the materials or apply pressure and heat to the materials to attach the materials to each other. Because of the attachment, the stacking of the radical units may be more easily performed while manufacturing the cell stack part. Also, the alignment of the radical units may be also easily accomplished because of the attachment. After the attachment, the first separator material 122 and the second separator material 124 are cut into a certain size through a cutter C3 to manufacture the radical unit 110a. During this process, the edges of the separators are not joined with each other.

As described above, the electrode may be attached to the adjacent separator in the radical unit. Alternatively, the separator may be attached to the adjacent electrode. Here, it is preferable that an entire surface of the electrode facing the adjacent separator is attached to the adjacent separator. In this case, the electrode may be stably fixed to the separator. Typically, the electrode has a size less than that of the separator.

For this, an adhesive may be applied to the separator. However, when the adhesive is used, it is necessary to apply the adhesive over an adhesion surface of the separator in a mesh or dot shape. This is because if the adhesive is closely applied to the entire adhesion surface, reactive ions such as lithium ions may not pass through the separator. Thus, when the adhesive is used, it is difficult to allow the overall surface of the electrode to closely attach to the adjacent separator.

Alternatively, use of the separator including the coating layer having adhesive strength makes it possible to generally attach the electrode to the separator. This will be described below in more detail. The separator may include a porous separator base material such as a polyolefin-based separator base material and a porous coating layer that is generally applied to one side or both sides of the separator base material. Here, the coating layer may be formed of a mixture of inorganic particles and a binder polymer that binds and fixes the inorganic particles to each other.

Here, the inorganic particles may improve thermal stability of the separator. That is, the inorganic particles may prevent the separator from being contracted at a high temperature. In addition, the binder polymer may fix the inorganic particles to improve mechanical stability of the separator. Also, the binder polymer may attach the electrode to the separator. Since the binder polymer is generally distributed in the coating layer, the electrode may closely adhere to the entire adhesion surface of the separator, unlike the foregoing adhesive. Thus, when the separator is used as described above, the electrode may be more stably fixed to the separator. To enhance the adhesion, the above-described laminators may be used.

The inorganic particles may have a densely packed structure to form interstitial volumes between the inorganic particles over the overall coating layer. Here, a pore structure may be formed in the coating layer by the interstitial volumes that are defined by the inorganic particles. Due to the pore structure, even though the coating layer is formed on the separator, the lithium ions may smoothly pass through the separator. For reference, the interstitial volume defined by the inorganic particles may be blocked by the binder polymer according to a position thereof.

Here, the densely packed structure may be explained as a structure in which gravels are contained in a glass bottle.

Thus, when the inorganic particles form the densely packed structure, the interstitial volumes between the inorganic particles are not locally formed in the coating layer, but generally formed in the coating layer. As a result, when each of the inorganic particles increases in size, the pore formed by the interstitial volume also increases in size. Due the above-described densely packed structure, the lithium ions may smoothly pass through, the separator over the entire surface of the separator.

The radical units may also adhere to each other in the cell stack part. For example, if the adhesive or the above-described coating layer is applied to a bottom surface of the second separator 114 in FIG. 1, the other radical unit may adhere to the bottom surface of the second separator 114.

Here, the adhesive strength between the electrode and the separator in the radical unit may be greater than that between the radical units in the cell stack part. It is understood, that the adhesive strength between the radical units may not be provided. In this case, when the electrode assembly or the cell stack part is disassembled, the electrode assembly may be separated into the radical units due to a difference in the adhesive strength. For reference, the adhesive strength may be expressed as delamination strength. For example, the adhesive strength between the electrode and the separator may be expressed as a force required for separating the electrode from the separator. In this manner, the radical unit may not be bonded to the adjacent radical unit in the cell stack part, or may be bonded to the adjacent radical unit in the cell stack part by means of a bonding strength differing from a bonding strength between the electrode and the separator.

For reference, when the separator includes the above-described coating layer, it is not preferable to perform ultrasonic welding on the separator. Typically, the separator has a size greater than that of the electrode. Thus, there may be an attempt to bond the edge of the first separator 112 to the edge of the second separator 114 through the ultrasonic welding. Here, it is necessary to directly press an object to be welded through a horn in the ultrasonic welding. However, when the edge of the separator is directly pressed through the horn, the separator may adhere to the horn due to the coating layer having the adhesive strength. As a result, the welding apparatus may be broken down.

[Modification of Radical Unit]

Until now, the radical units having the same size have been explained. However, the radical units may have different sizes. When stacking the radical units having different sizes, cell stack parts having various shapes may be manufactured. Herein, the size of the radical unit is explained with reference to the size of the separator, because, typically, the separator is larger than the electrode.

Figure 8:
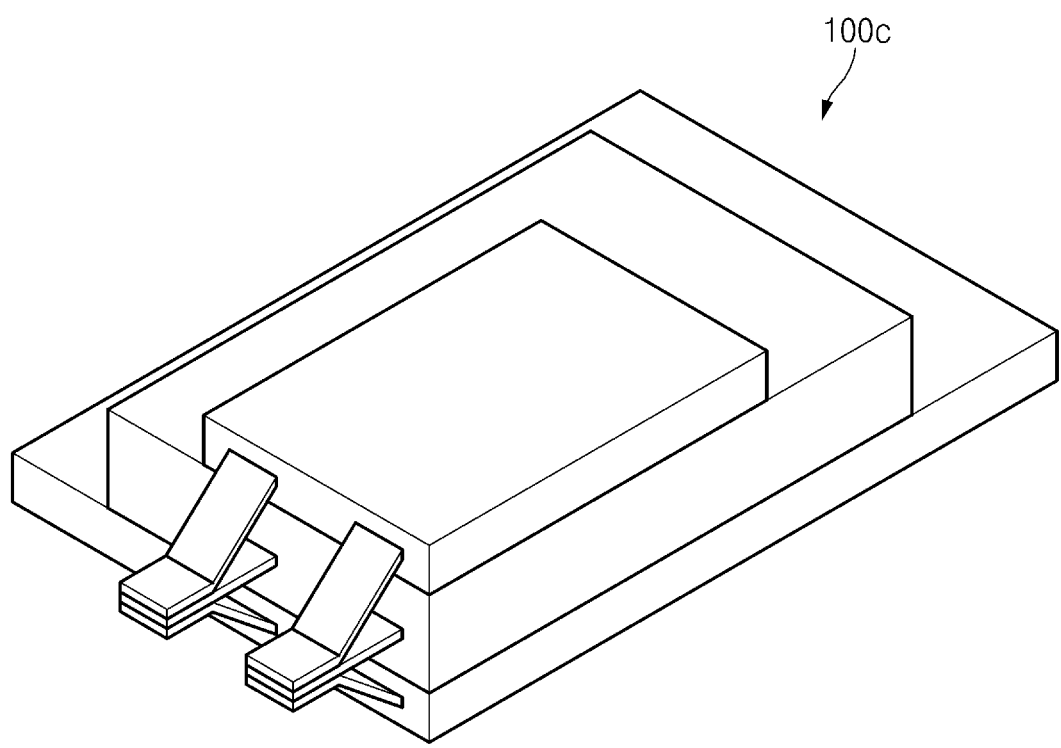
FIG. 8 is a perspective view illustrating a cell stack part formed by stacking radical units having different sizes.
Figure 9:
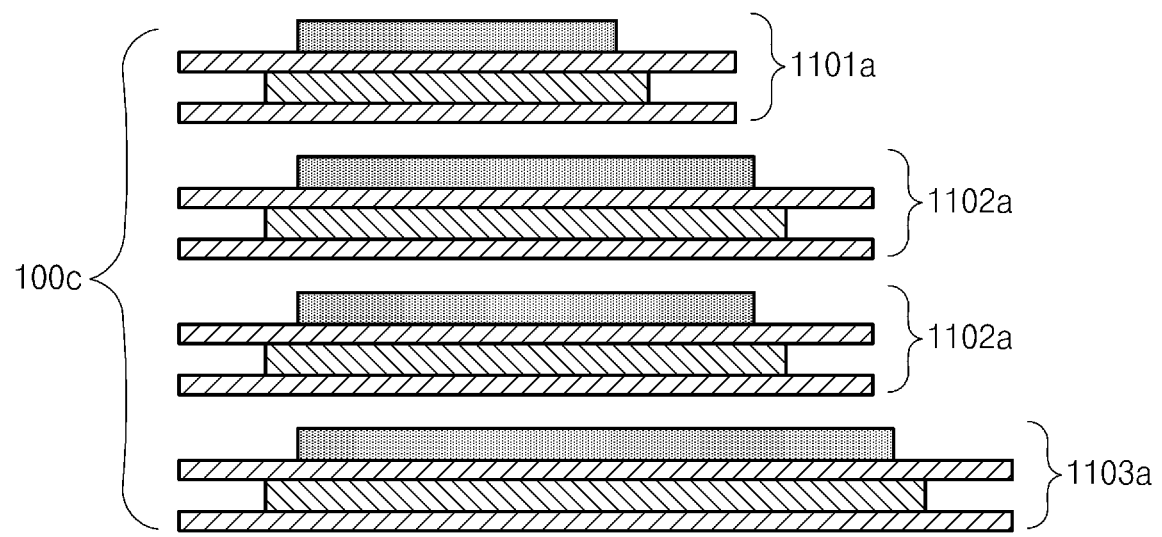
FIG. 9 is a side view illustrating the cell stack part of FIG. 8.

Referring to FIGS. 8 and 9, a plurality of radical units is prepared and may be classified into at least two groups having different sizes (see reference numerals 1101a, 1102a and 1103a in FIG. 9). By stacking the radical units according to their sizes, a cell stack part 100c having a structure of a plurality of steps may be formed. FIGS. 8 and 9 illustrate an embodiment in which the cell stack part includes three steps obtained by stacking the radical units 1101a, 1102a and 1103a classified into three groups, in which the radical units having the same size are stacked together, is illustrated. Thus, the cell stack part 100c in FIGS. 8 and 9 have a structure including three steps. For reference, the radical units included in one group may form two or more steps.

When the plurality of steps is formed as described above, it is preferable that the radical unit has a structure of the first radical unit, that is, the above-described four-layered structure or the repeating structure in which the four-layered structure is repeatedly stacked. (Herein, the radical units are considered to be included in one kind of radical unit even though the radical units have the same stacked structures of the but have different sizes.)

Preferably, the same number of cathodes and the anodes are stacked in one step. Also, it is preferable that opposite electrodes face each other through a separator between one step and another step. For example, in case of the second and third radical units, two kinds of the radical units are necessary for forming one step.

However, in case of the first radical unit, only one kind of radical unit is necessary for forming one step as illustrated in FIG. 9. Thus, when the radical unit has the four-layered structure or the repeating structure in which the four-layered structure is repeatedly stacked, number of kinds of radical units may decrease even though a plurality of the steps is formed.

Also, in case of the second and the third radical units, at least one of the two kinds of the radical units are necessary to be stacked to form one step. Thus, the one step may have at least a twelve-layered structure. However, in case of the first radical unit, only one kind of radical unit is necessary to be stacked to form one step. Thus, one step may have at least a four-layered structure. As a result, when the radical unit has the four-layered structure or the repeating structure in which the four-layered structure is repeatedly stacked, the thickness of each step may be easily controlled when forming a plurality of steps.

Figure 10:
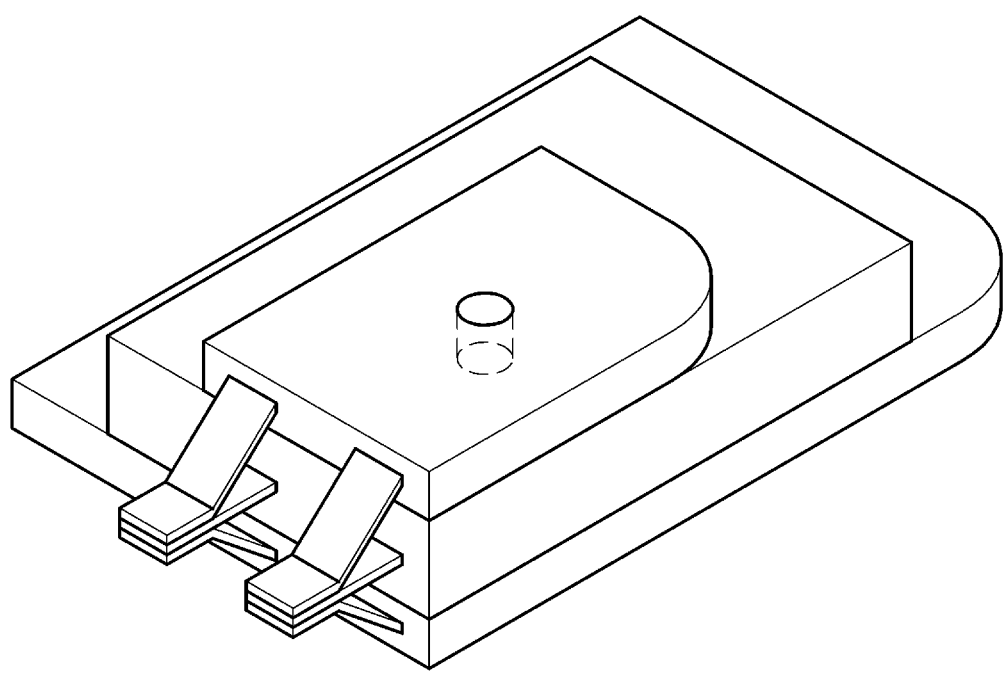
FIG. 10 is a perspective view illustrating a cell stack part formed by stacking radical units having different geometric shapes.

The radical units may have not only different sizes but also different geometric shapes. For example, the radical units may have different sizes and different edge shapes, and may or may not have a through hole as illustrated in FIG. 10. More particularly, as illustrated in FIG. 10, a plurality of radical units classified into three groups may form three steps by stacking the radical units having the same geometric shapes. For this, the radical units may be classified into at least two groups (each of the groups has different geometric shape). Similarly, the radical unit may preferably have the four-layered structure or the repeating structure in which the four-layered structures are repeatedly stacked, that is, the structure of the first radical unit. (Herein, the radical units are considered to be included in one kind of radical unit even though the radical units have the same stacked structure but have different geometric shapes.)

[Auxiliary Unit]

The cell stack part may further include at least one among a first auxiliary unit and a second auxiliary unit. First, the first auxiliary unit will be described below. In the present disclosure, an electrode is positioned at one end of the radical unit, and a separator is positioned at the other end of the radical unit. When the radical units are stacked in sequence, the electrode may be positioned at the uppermost portion or at the lowermost portion of the cell stack part (see reference numeral 116 in FIG. 11, and this electrode may be referred to as a terminal electrode 116). The first auxiliary unit is additionally stacked on the terminal electrode.

Figure 11:
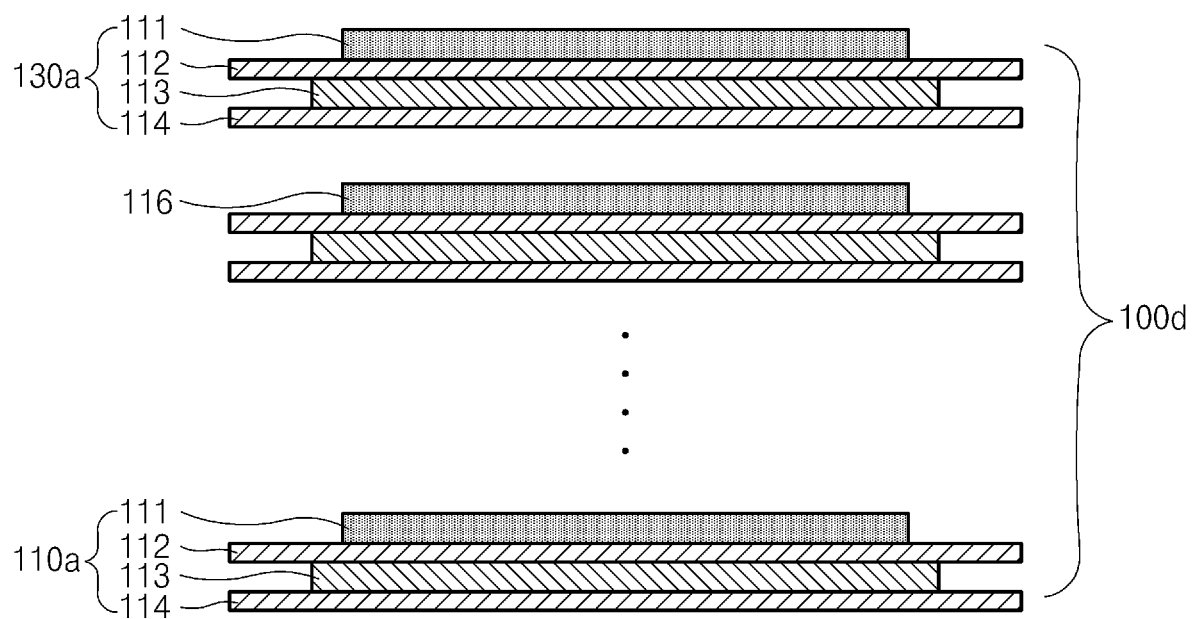
FIG. 11 is a side view illustrating a first structure of a cell stack part including a radical unit and a first auxiliary unit according to the present disclosure.

In more detail, when the terminal electrode 116 is a cathode, the first auxiliary unit 130a may be formed by stacking outward from the terminal electrode 116, a separator 114, an, anode 113, a separator 112, and a cathode 111 in sequence, as illustrated in FIG. 11. On the other hand, when the terminal electrode 116 is an anode, the first auxiliary unit 130b may be formed by stacking outward from the terminal electrode 116, the separator 114, and the cathode 113 in sequence, as illustrated in FIG. 12.

Figure 12:
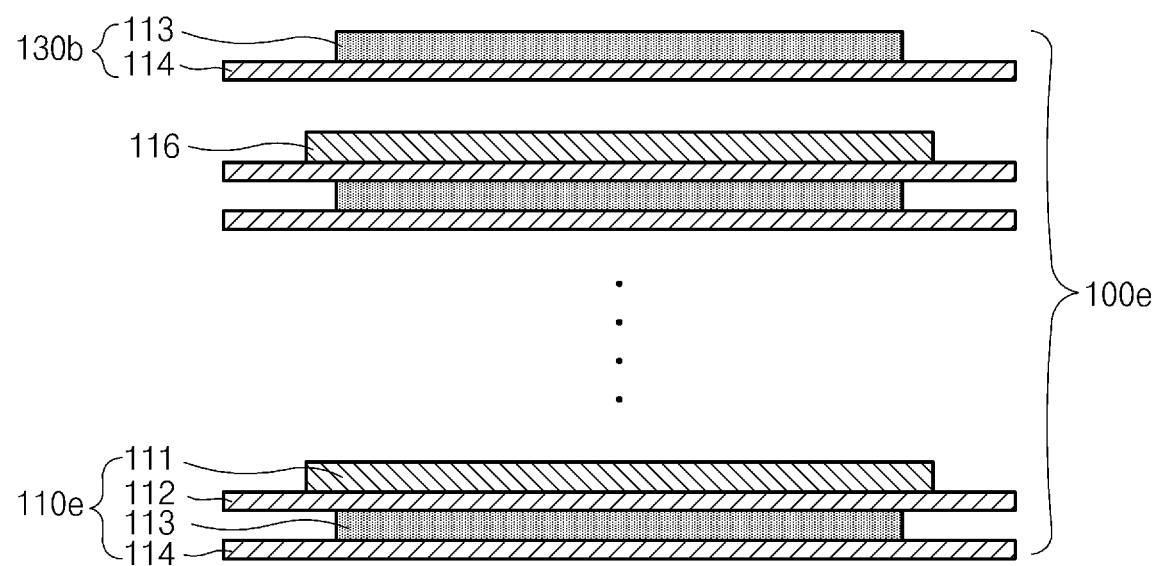
FIG. 12 is a side view illustrating a second structure of a cell stack part including a radical unit and a first auxiliary unit according to the present disclosure.

In the cell stack parts 100*d* and 100*e*, a cathode may be positioned at the outermost portion through the first auxiliary units 130*a* and 130*b*, as illustrated in FIGS. 11 and 12. In this case, in the cathode positioned at the outermost portion, that is, the cathode of the first auxiliary unit, an active material layer is preferably coated on only one side facing the radical unit (one side facing downward in FIG. 11) among both sides of the current collector. When the one side of the current collector is coated with the active material layer as described above, the active material layer is not positioned at the outermost portion of the cell stack part. Thus, waste of the active material layer may be prevented. For reference, since the cathode emits, for example, lithium ions, when the cathode is positioned at the outermost portion, the capacity of a battery may be improved.

Next a second auxiliary unit will be described below. The second auxiliary unit performs the same function as the first auxiliary unit, which will be described below in more detail. In the present disclosure, an electrode is positioned at one side end of the radical unit, and a separator is positioned at the other side end of the radical unit. When the radical units are stacked in sequence, the separator may be positioned at the uppermost portion or at the lowermost portion of the cell stack part (see reference numeral 117 in FIG. 13, and this separator may be referred to as a terminal separator 117). The second auxiliary unit is additionally stacked on the terminal separator.

Figure 13:
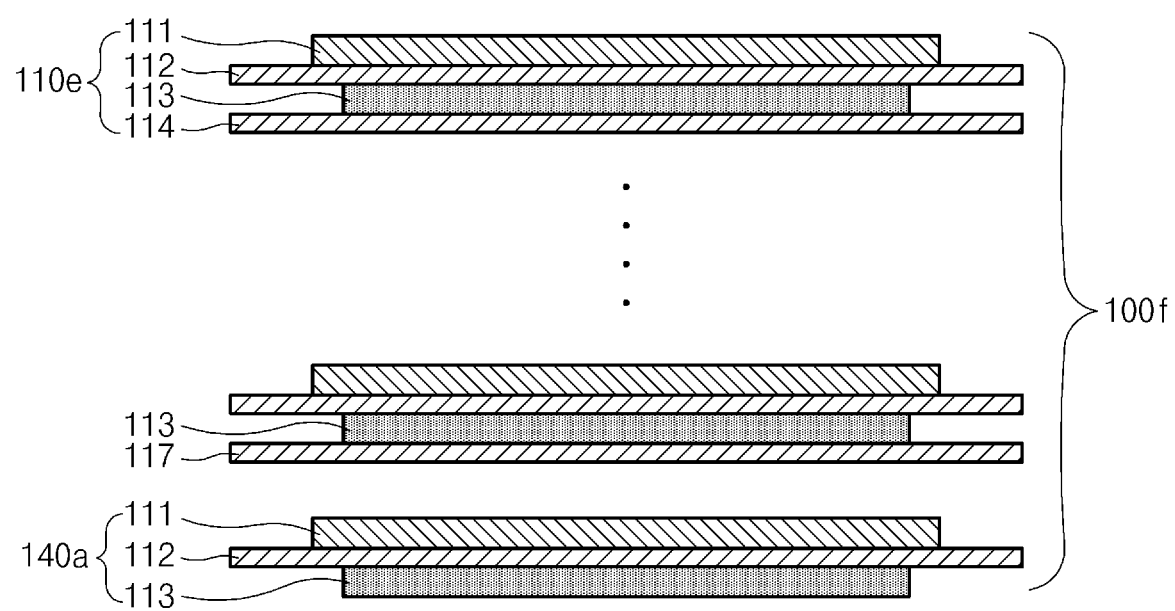
FIG. 13 is a side view illustrating a third structure of a cell stack part including a radical unit and a second auxiliary unit according to the present disclosure.

In more detail, when the electrode 113 contacting the terminal separator 117 is a cathode in the radical unit, the second auxiliary unit 140*a* may be formed by stacking from the terminal separator 117, an anode 111, a separator 112, and a cathode 113 in sequence, as illustrated in FIG. 13. On the other hand, when the electrode 113 contacting the terminal separator 117 is an anode in the radical unit, the second auxiliary unit 140*b* may be formed as the cathode 111, as illustrated in FIG. 14.

Figure 14:
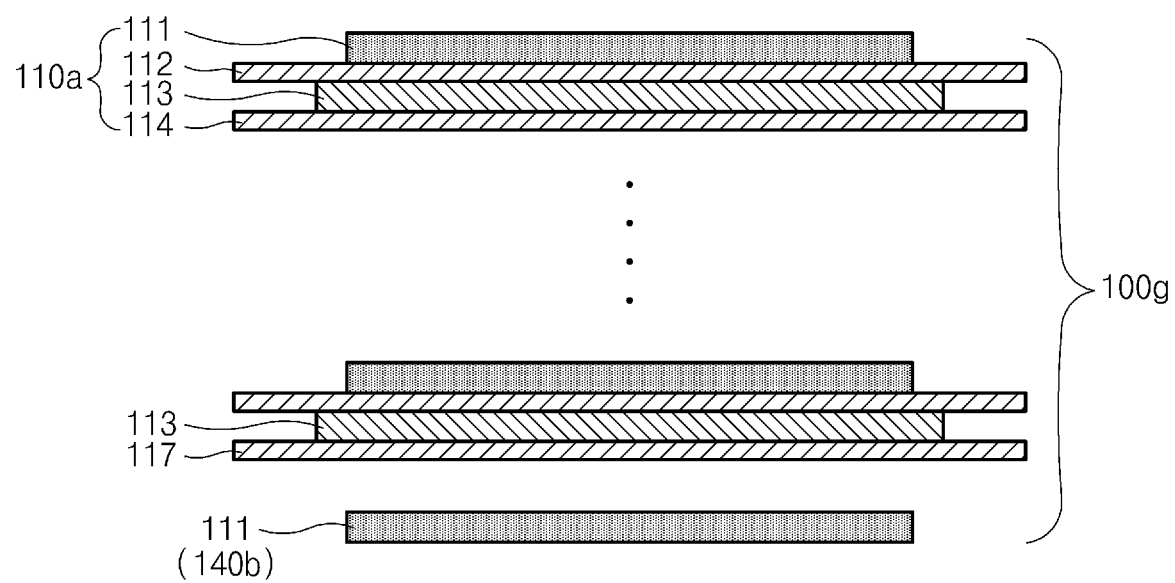
FIG. 14 is a side view illustrating a fourth structure of a cell stack part including a radical unit and a second auxiliary unit according to the present disclosure.

In the cell stack parts 100*f* and 100*g*, a cathode may be positioned at the outermost portion of the terminal separator through the second auxiliary units 140*a* and 140*b*, as illustrated in FIGS. 13 and 14. In this case, in the cathode positioned at the outermost portion, that is, the cathode of the second auxiliary unit, an active material layer is preferably coated on only one side facing the radical unit (one side facing upward in FIG. 13) among both sides of the current collector, as similar to the cathode of the first auxiliary unit.

Figure 15:
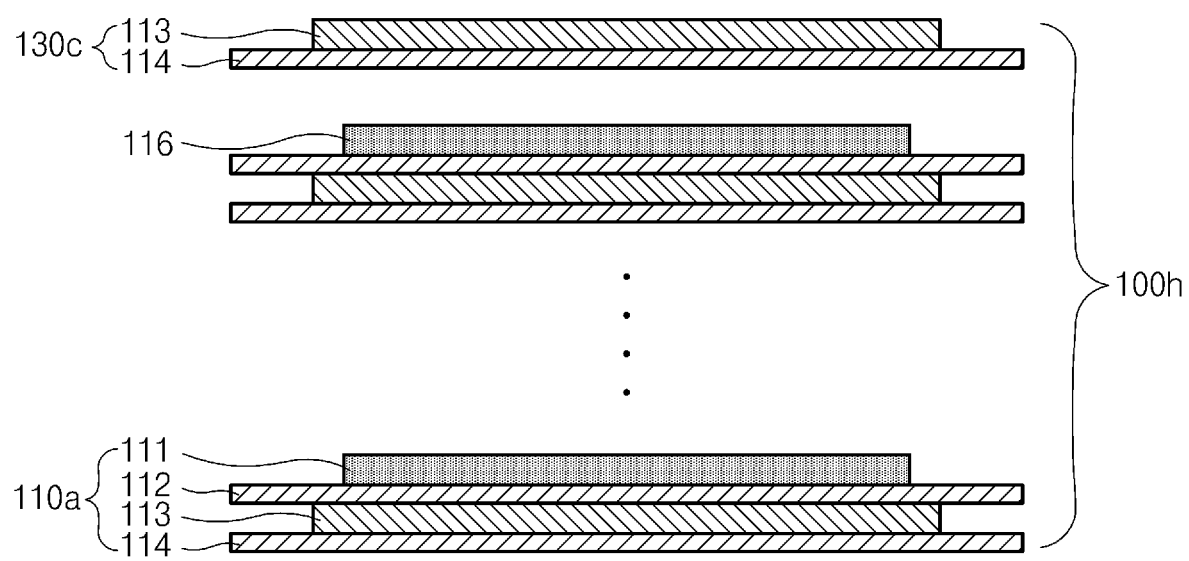
FIG. 15 is a side view illustrating a fifth structure of a cell stack part including a radical unit and a first auxiliary unit according to the present disclosure.

The first auxiliary unit and the second auxiliary unit may have different structures from those described above. First, the first auxiliary unit will be described below. When the terminal electrode 116 is a cathode as illustrated in FIG. 15, the first auxiliary unit 130*c* may be formed by stacking from the terminal electrode 116, a separator 114, and an anode 113 in sequence. On the other hand, when the terminal electrode 116 is an anode as illustrated in FIG. 16, the first auxiliary unit 130*d* may be formed by stacking from the terminal electrode 116, a separator 114, a cathode 113, a separator 112, and an anode 111 in sequence.

Figure 16:
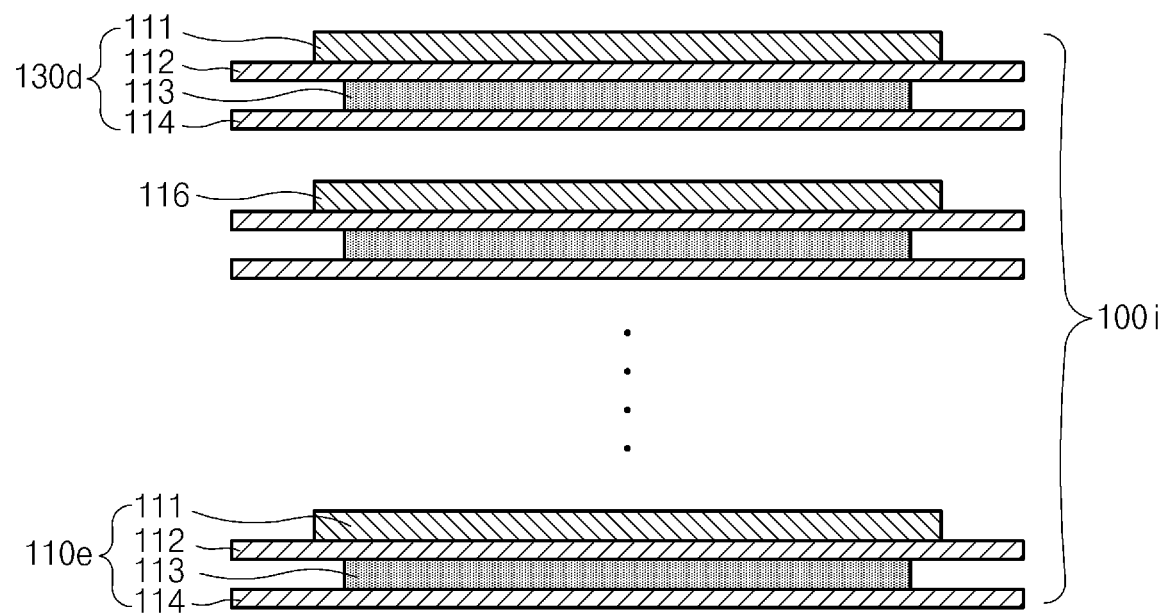
FIG. 16 is a side view illustrating a sixth structure of a cell stack part including a radical unit and a first auxiliary unit according to the present disclosure.

In the cell stack parts 100*h* and 100*i*, the anode may be positioned at the outermost portion of the terminal electrode through the first auxiliary units 130*c* and 130*d* as illustrated in FIGS. 15 and 16.

Figure 17:
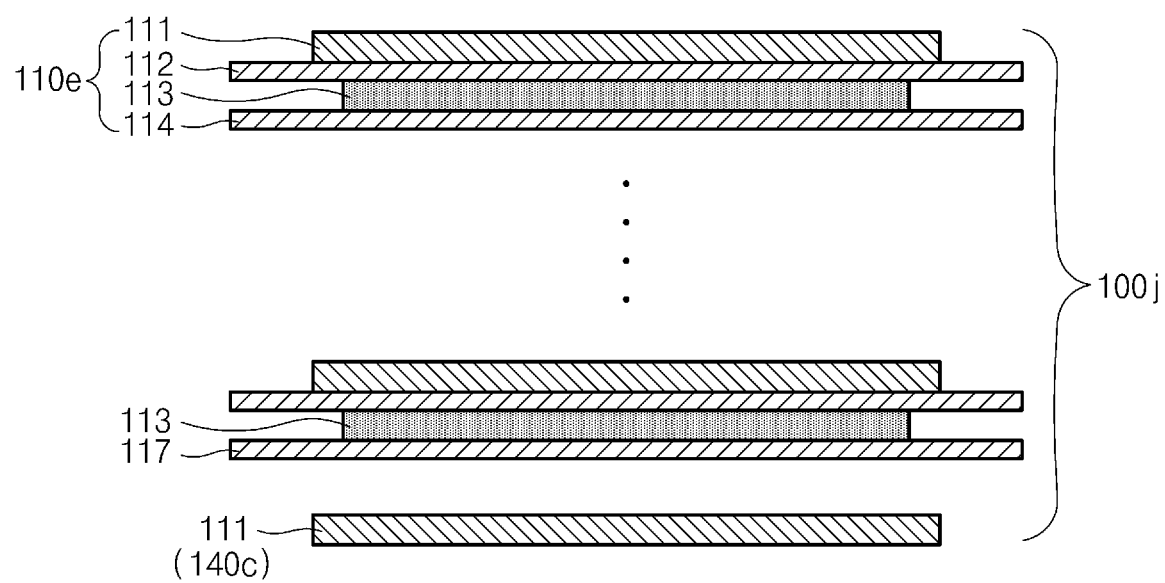
FIG. 17 is a side view illustrating a seventh structure of a cell stack part including a radical unit and a second auxiliary unit according to the present disclosure.
Figure 18:
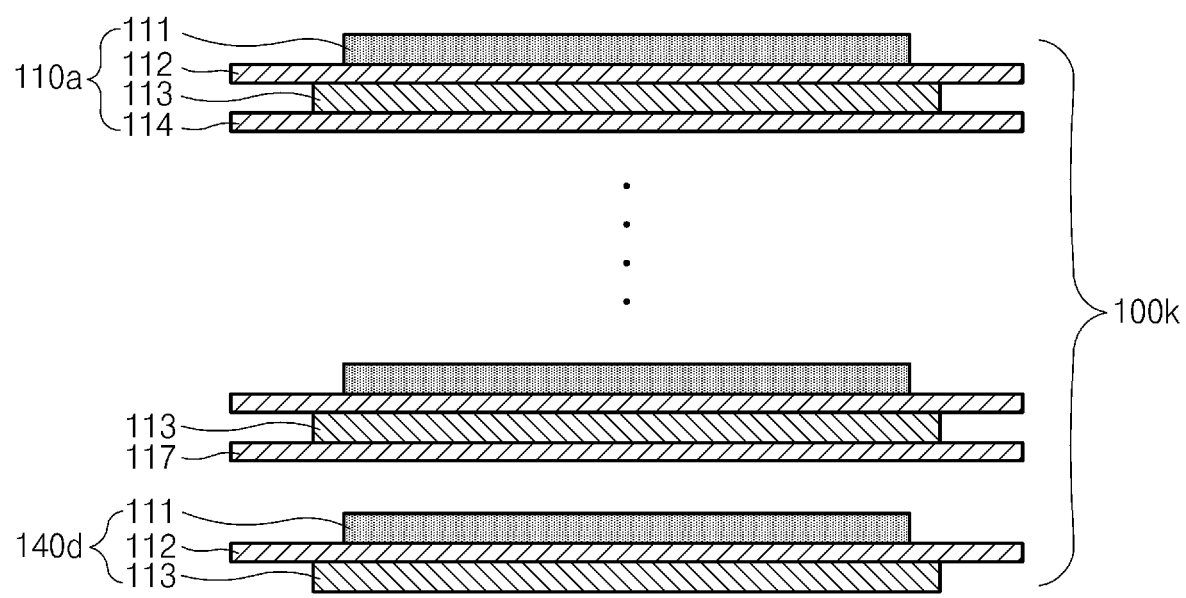
FIG. 18 is a side view illustrating an eighth structure of a cell stack part including a radical unit and a second auxiliary unit according to the present disclosure.

Next, the second auxiliary unit will be described below. As illustrated in FIG. 17, when the electrode 113 contacting the terminal separator 117 is a cathode in the radical unit, the second auxiliary unit 140*c* may be formed as an anode 111. As illustrated in FIG. 18, when the electrode 113 contacting the terminal separator 117 is an anode in the radical unit, the second auxiliary unit 140*d* may be formed by stacking from the terminal separator 117, the cathode 111, the separator 112, and the anode 113 in sequence. In the cell stack parts 100*j* and 100*k*, an anode may be positioned at the outermost portion of the terminal separator through the second auxiliary units 140*c* and 140*d* as illustrated in FIGS. 17 and 18.

Figure 19:
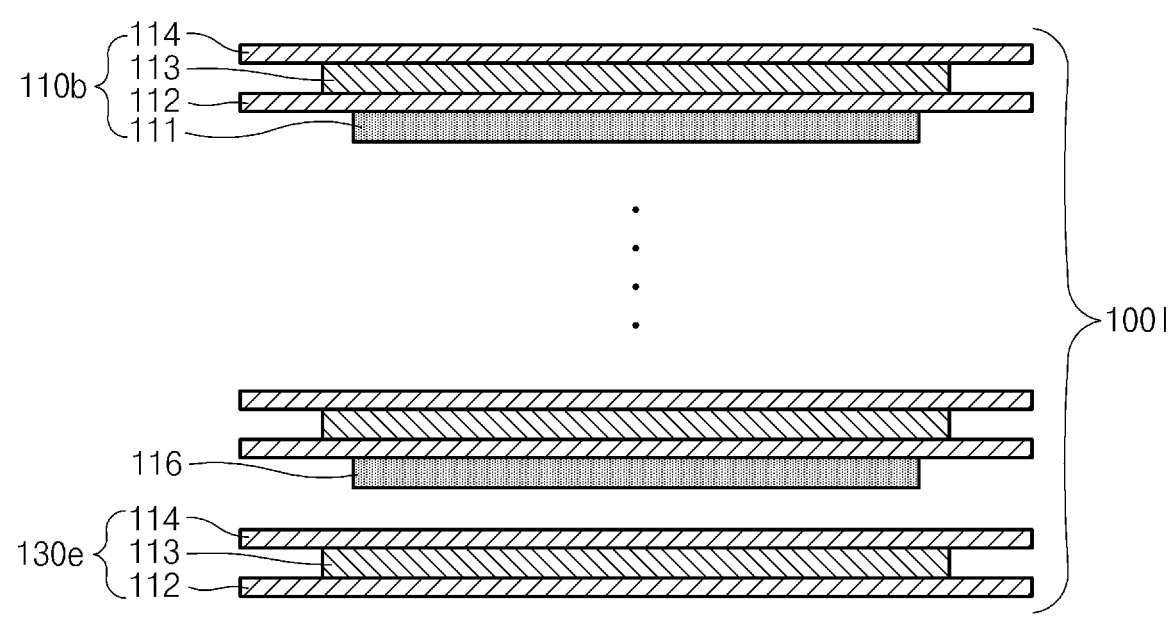
FIG. 19 is a side view illustrating a ninth structure of a cell stack part including a radical unit and a first auxiliary unit according to the present disclosure.

For reference, an anode may make a reaction with an aluminum layer of a battery case (for example, a pouch-type case) due to potential difference. Thus, the anode is preferably insulated from the battery case by means of a separator. For this, the first and second auxiliary units in FIGS. 15 to 18 may further include a separator at the outer portion of the anode. For example, the first auxiliary unit 130*e* in FIG. 19 may further include a separator 112 at the outermost portion thereof when compared with the first auxiliary unit 130*c* in FIG. 15. For reference, when the auxiliary unit includes the separator, the alignment of the auxiliary units in the radical unit may be easily performed.

Figure 20:
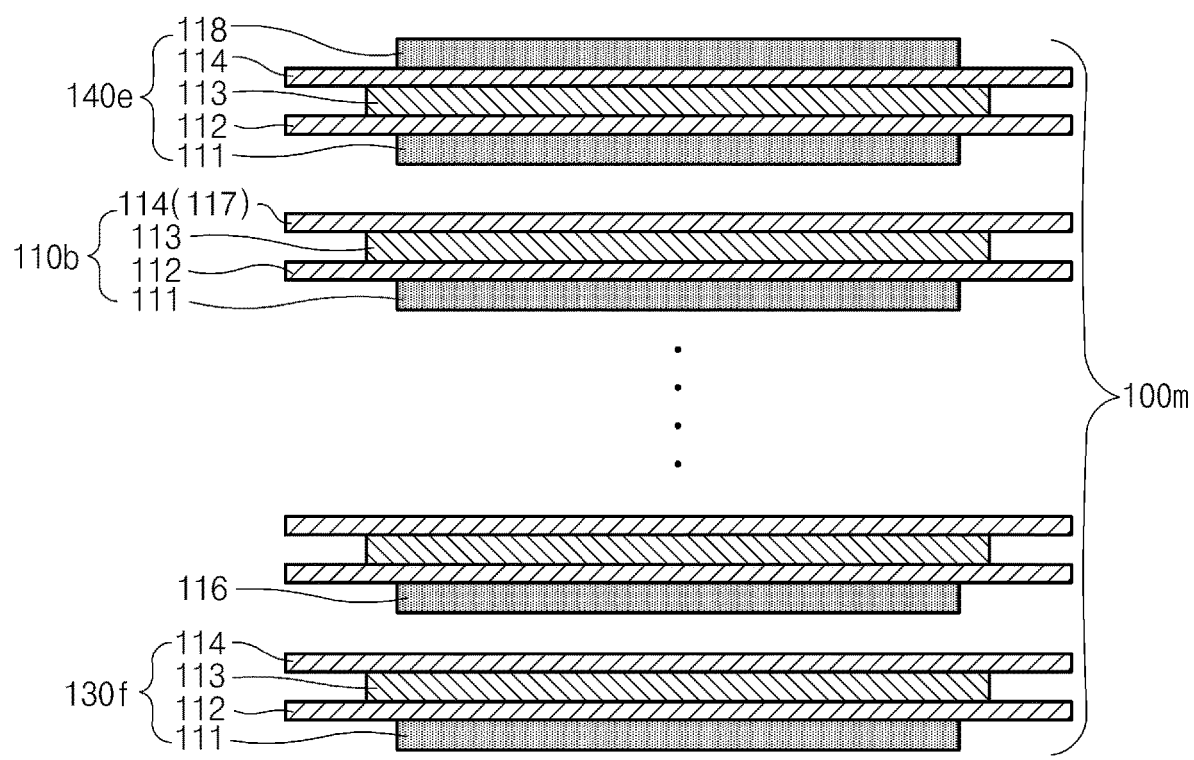
FIG. 20 is a side view illustrating a tenth structure of a cell stack part including a radical unit, a first auxiliary unit, and a second auxiliary unit according to the present disclosure.

A cell stack part 100*m* may be formed as illustrated in FIG. 20. A radical unit 110*l*) may be formed by stacking from the lower portion to the upper portion, a first electrode 111, a first separator 112, a second electrode 113, and a second separator 114 in sequence. In this case, the first electrode 111 may be a cathode, and the second electrode 113 may be an anode.

A first auxiliary unit 130*f* may be formed by stacking from the terminal electrode 116, the separator 114, the anode 113, the separator 112 and the cathode 111 in sequence. In this case, in the cathode 111 of the first auxiliary unit 130*f*, only one side of a current collector facing the radical unit 110*b* among both sides of the current collector may be coated with an active material layer.

Also, a second auxiliary unit 140*e* may be formed by stacking from the terminal separator 117, the cathode 111 (the first cathode), the separator 112, the anode 113, the separator 114, and the cathode 118 (the second cathode) in sequence. In this case, in the cathode 118 (the second cathode) of the second auxiliary unit 140*e* positioned at the outermost portion, only one side of a current collector facing the radical unit 110*b* among both sides of the current collector may be coated with an active material layer.

Figure 21:
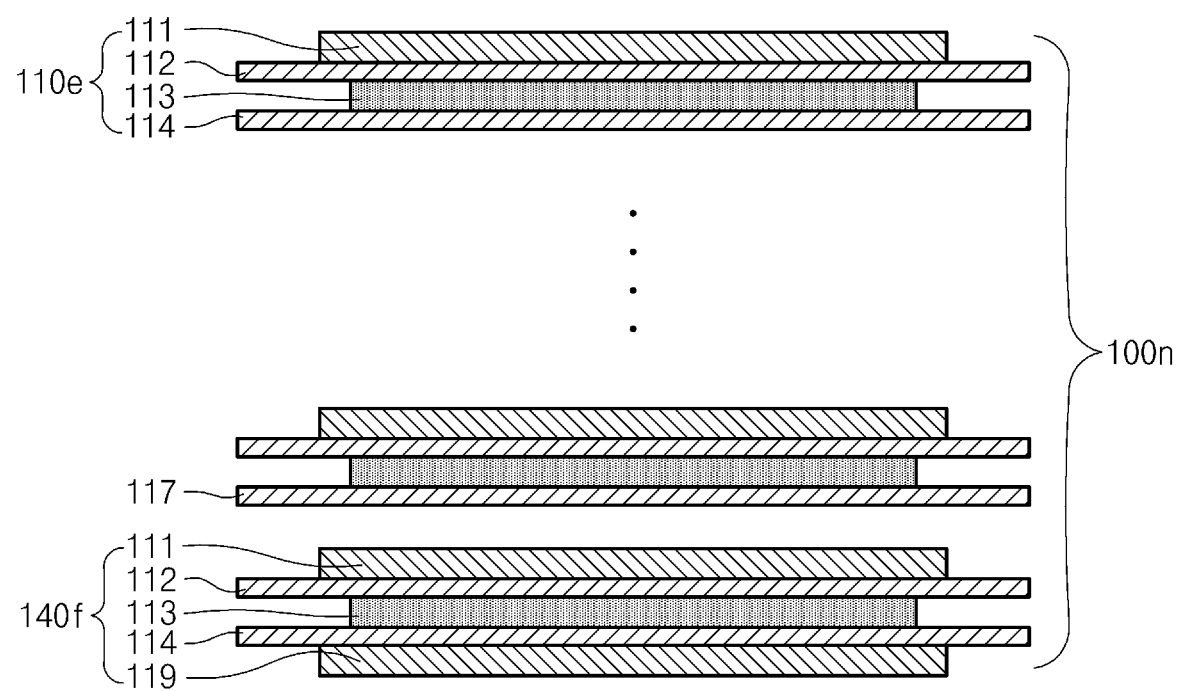
FIG. 21 is a side view illustrating an eleventh structure of a cell stack part including a radical unit and a second auxiliary unit according to the present disclosure.

Finally, a cell stack part 100*n* may be formed as illustrated in FIG. 21. A radical unit 110*e* may be formed by stacking from the upper portion to the lower portion, a first electrode 111, a first separator 112, a second electrode 113, and a second separator 114 in sequence. In this case, the first electrode 111 may be an anode, and the second electrode 113 may be a cathode. Also, a second auxiliary unit 140*f* may be formed by stacking from the terminal separator 117, the anode 111, the separator 112, the cathode 113, the separator 114, and the anode 119 in sequence.

[Embodiments of Radical Unit]

A second separator 114 which is an outer separator among separators 112 and 114 of a radical unit 110 positioned at the outermost part of a cell stack part is formed to be extended from the side of the cell stack part.

Preferably, the second separator 114 is extended along the side of the cell stack part to the outermost part of the opposite outermost side of the cell stack part and fixes the cell stack part.

The outermost second separator 114 is extended from the radical unit 110 where the second separator 114 is positioned via the outermost part of the opposite outermost side of the cell stack part to the radical unit 110 where the second separator 114 is positioned again, so as to fix the cell stack part.

Meanwhile, the outermost second separator 114 is extended from side to side from the radical unit 110 where the second separator 114 is positioned. One end part of the second separator 114 is extended along one side of the cell stack part to the outermost part of the opposite outermost side of the cell stack part, and the other end part of the second separator 114 is extended along the other side of the cell stack part to the outermost part of the opposite outermost side of the cell stack part, thereby fixing the cell stack part.

In this case, the radical unit 110 may include at least one radical unit, and may be obtained by stacking two or more radical units according to capacity.

Figure 22:
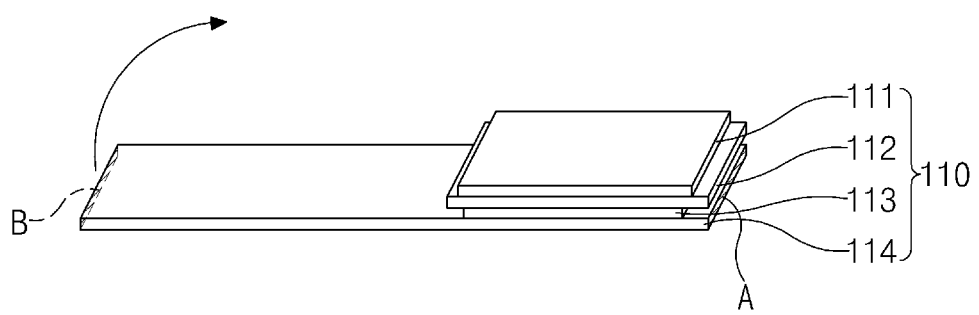
FIG. 22 is a diagram illustrating an embodiment of a single structure of a radical unit according to the present disclosure.
Figure 23:
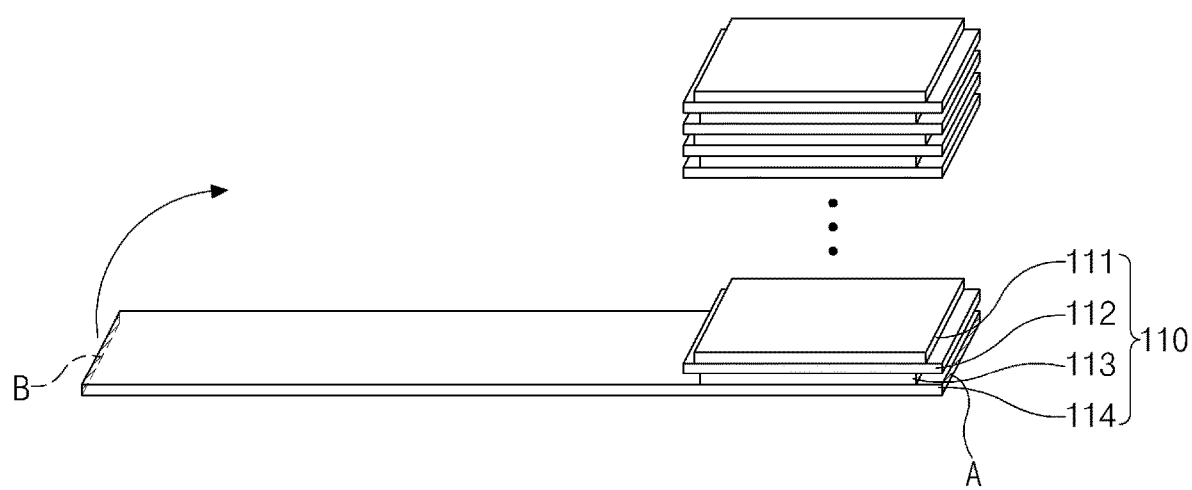
FIG. 23 is a diagram illustrating an embodiment of a multiple structure of radical units according to the present disclosure.
Figure 24:
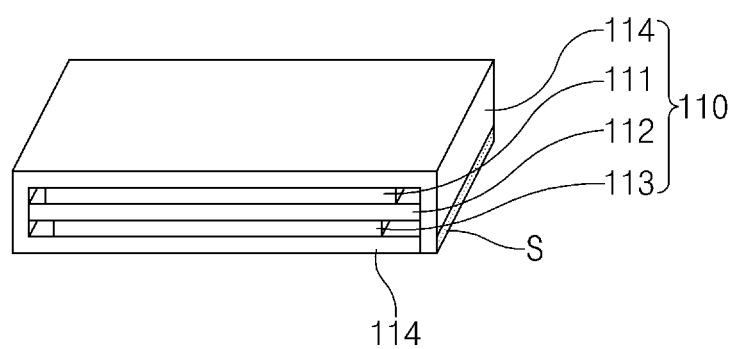
FIG. 24 is a diagram illustrating the sealing state of a single structure of a radical unit according to the present disclosure.
Figure 25:
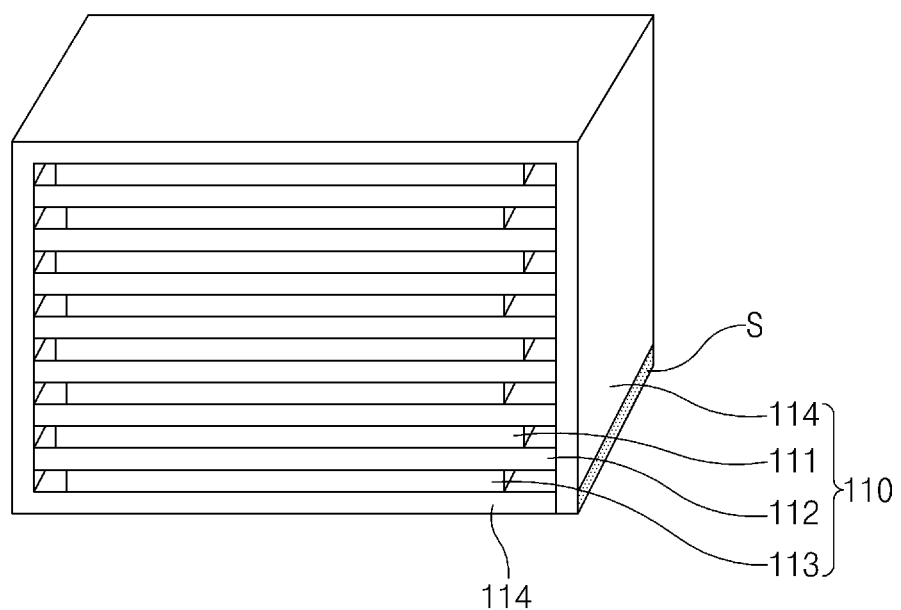
FIG. 25 is a diagram illustrating the sealing state of a multiple structure of radical units according to the present disclosure.

For example, the length of the second separator 114 forming the radical unit 110 is longer than the length of the perimeter of the outer sides of the radical unit 110 so that the second separator 114 winds around the outer sides of the radical unit 110, as illustrated in FIGS. 22 and 23.

As a result, electrode loss phenomenon generated during performing a common folding process may be eliminated, and wetting properties of an electrode assembly may be improved by forming the radical unit 110 having a structure obtained by winding the second separator 114 around stacked electrodes and separators. In addition, by covering the radical unit 110 using the second separator 114, the thickness of a cell may be decreased, and production cost may be saved.

In this case, the second separator 114 preferably winds around the radical unit 110 by one lap.

The radical unit 110 may be formed by stacking downwards anode/first separator 112/cathode/second separator 114 or cathode/first separator 112/anode/second separator 114 in sequence. That is, the radical unit 110 is formed by providing the second separator 114 at the bottom part, providing the anode on the second separator 114, providing the first separator 112 on the anode and stacking the cathode on the first separator 112, or by providing the second separator 114 at the bottom part, providing the cathode on the second separator 114, providing the first separator 112 on the cathode and stacking the anode on the first separator 112.

As described above, on an end part A of the second separator 114, a first electrode 111, a first separator 112, and a second electrode 113 are stacked in sequence, and the other end part B of the long second separator 114 is wound around the radical unit 110 and is positioned at the end part A of the second separator 114. In this case, the other end part B of the second separator 114 may overlap the end part A of the second separator 114, or both end parts A and B may make a contact.

After winding the radical unit 110 by the second separator 114, both end parts of the second separator 114 may be attached through a sealing S by heat welding or using a tape.

Figure 26:
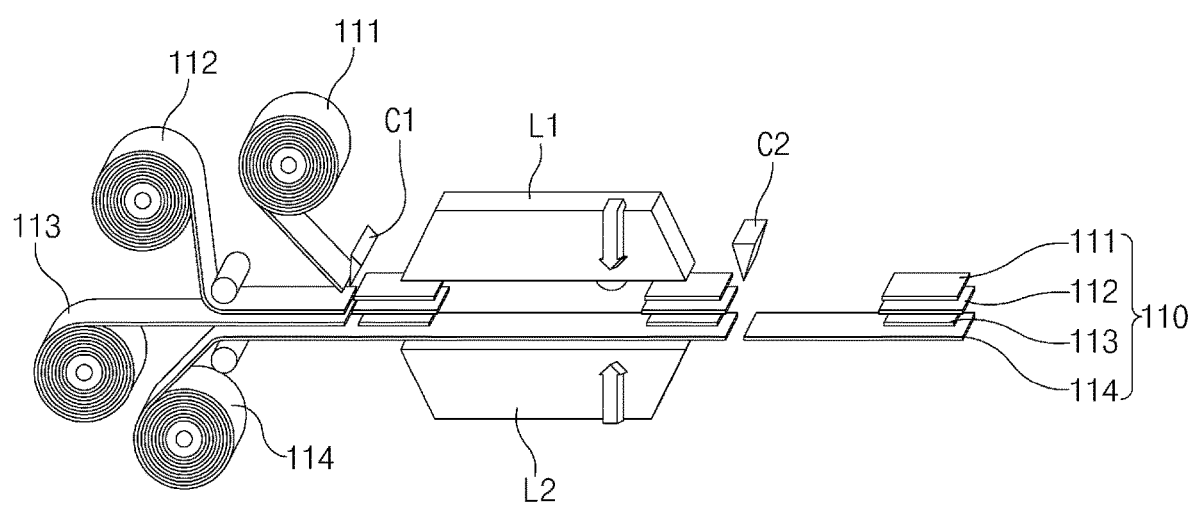
FIG. 26 is a process diagram illustrating a manufacturing process of an electrode assembly in a method of manufacturing an electrode assembly according to the present disclosure.
Figure 27:
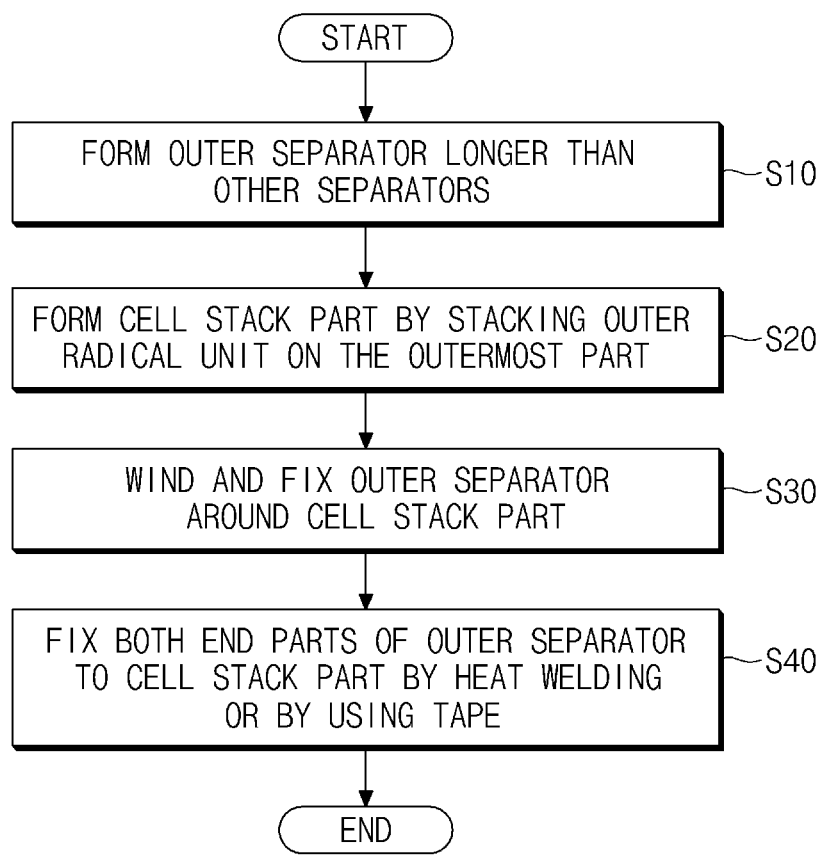
FIG. 27 is a flowchart illustrating a method of manufacturing an electrode assembly according the present disclosure.

In this case, the sealing S may be accomplished by welding both end parts of the second separator 114 and attaching thereof by using a thermal device. Thus, an attachment process by taping conducted in a common technique may be omitted, manufacturing process may be simplified, and production cost may be decreased. The method of manufacturing an electrode assembly according to the present disclosure includes a first step (S10) of forming a longer outer separator positioned at the outermost part in at least two radical units 110 than other separators, a second step (S20) of forming a cell stack part by stacking the radical units 110, and a third step (S30) of winding and fixing the outer separator around the cell stack part, as illustrated in FIGS. 26 and 27.

In the first step (S10), one kind of radical unit 110 having a structure obtained by alternately stacking the same number of electrodes and separators, or at least two kinds of radical units 110 having a structure obtained by alternately stacking the same number of electrodes and separators is formed, wherein the outer separator that is a separator among the separators in an outer radical unit positioned at the outermost part among the radical units is the longest.

Each of the electrodes and each of the separators are supplied in laminators L1 and L2 and are supplied at the same time by disposing a loading unit (loading roll) so as to stack first electrode 111/first separator 112/second electrode 113/second separator 114 in sequence.

Particularly, the first electrode 111 and the second electrode 113 are preferably disposed as a cathode and anode, or an anode and a cathode.

In the first step (S10), the radical unit 110 is formed by stacking an electrode material cut into a certain size on at least one separator material and cutting the at least one separator material to a certain size. In this case, the separator material corresponding to the outer separator among the separator materials is cut so as to have the greatest length than other separator materials.

Preferably, the outer radical unit 110 is formed last in the first step (S10).

In the second step (S20), the one kind of the radical units are repeatedly stacked, or the at least two kinds of the radical units 110 are stacked in a predetermined order, for example, alternately to form the cell stack part in which the outer radical unit 110 is stacked on the outermost part.

In the third step (S30), the cell stack part is wound and fixed by the outer separator 114 of the outer radical unit 110.

Meanwhile, after winding the outer separator 114 around the cell stack part, a fourth step (S40) of fixing the outer end part of the outer separator 114 to the cell stack part by heat welding or by using a tape may preferably be performed.

In addition, the outer separator 114 becomes a separator positioned at the outermost part of the cell stack part among the separators of the radical unit 110 positioned at the outermost part of the cell stack part.

In this case, the one kind of the radical unit has a four-layered structure in which a first electrode, a first separator, a second electrode and a second separator are sequentially stacked or a structure in which the four-layered structures are repeatedly stacked. In addition, each of the at least two kinds of radical units are stacked by ones in a predetermined order to form the four-layered structure or the structure in which the four-layered structures are repeatedly stacked.

By applying the stacking structure of the radical unit 110 of the present disclosure through the above-described steps, electrode damage generated in a common folding process may be decreased, and wetting properties may be improved. At the same time, unnecessary process equipments may be removed, and production cost may be saved.

While the present invention has been shown and described in connection with the exemplary embodiments, it will be apparent to those skilled in the art that modifications and variations can be made without departing from the spirit and scope of the invention as defined by the appended claims.

DESCRIPTION OF REFERENCE NUMERAL 100a-100n: cell stack parts
110a-110e: radical units
111: first electrode
112: first separator
113: second electrode
114: second separator 116: terminal electrode
117: terminal separator
121: first electrode material
122: first separator material
123; second electrode material
124: second separator material
130a-130f: first auxiliary units
140a-140f: second auxiliary units

The invention claimed is:

1. An electrode assembly, comprising:
a cell stack part having (a) a structure in which one kind of radical unit is repeatedly disposed, the one kind of radical unit having a same number of electrodes and separators which are alternately disposed, or (b) a structure in which at least two kinds of radical units are disposed in a predetermined order, the at least two kinds of radical units each having a same number of electrodes and separators which are alternately disposed,
wherein the one kind of radical unit of (a) has a four-layered structure in which a first electrode, a first separator, a second electrode and a second separator are sequentially stacked or a repeating structure in which the four-layered structure is repeatedly stacked,
wherein each of the at least two kinds of radical units of (b) are stacked by ones in the predetermined order to form the four-layered structure or the repeating structure in which the four-layered structure is repeatedly stacked,
wherein an outer separator that is a separator among separators of a radical unit positioned at an outermost part of the cell stack part is longer than a side of the cell stack part,
wherein the electrode is attached to an adjacent separator in each radical unit,
wherein adhesive strength between the electrode and the adjacent separator in the radical unit is greater than adhesive strength between the radical units in the cell stack part
wherein the separators include a coating layer that is adhesive,
wherein attachment between an electrode and a separator is provided by applying pressure to the electrode and an adjacent separator with laminators or by applying pressure and heat to the electrode and the adjacent separator with the laminators to adhere the electrode and the separator in the radical unit with a first adhesion strength,
wherein adjacent radical units are adhered with each other in the cell stack part with a second adhesion strength by a heat press method, and
wherein the first adhesion strength between the electrode and the separator in the radical unit is greater than the second adhesion strength between the radical units in the cell stack part.

2. The electrode assembly of claim 1, wherein the outer separator is extended along the side of the cell stack part to an opposite outermost side of the outermost part of the cell stack part and fixes the cell stack part.

3. The electrode assembly of claim 1, wherein the outer separator is extended from the radical mlit where the outer separator is positioned via an opposite outermost side of the outermost part of the cell stack part to the radical unit where the outer separator is positioned again and fixes the cell stack part.

4. The electrode assembly of claim 1, wherein the outer separator is extended from side to side in the radical unit where the outer separator is positioned, wherein one end part of the outer separator is extended along one side of the cell stack part to an opposite outermost side of the outermost part of the cell stack part, and wherein the other end part of the outer separator is extended along the other side of the cell stack part to the opposite outermost side of the outermost part of the cell stack part, thereby fixing the cell stack part.

5. The electrode assembly according to claim 2, wherein an outer end part of the outer separator is fixed to the cell stack part by heat welding or by using a tape.

6. The electrode assembly of claim 1, wherein the outer separator is a separator positioned at the outermost part of the cell stack part among the separators of the radical unit positioned at the outermost part of the cell stack part.

7. The electrode assembly of claim 1, wherein the radical unit has an alternately disposed and integrally combined structure of the same number of electrodes and separators.

8. The electrode assembly of claim 7, wherein an edge of the separator is not joined with an edge of an adjacent separator in the radical unit.

9. The electrode assembly of claim 1,
wherein the one kind of radical unit of (a) comprises a first radical unit having the four . . . layered structure or the repeating structure in which the four-layered structure is repeatedly stacked, and
wherein the cell stack part has a structure in which the first radical units are repeatedly disposed.

10. The electrode assembly of claim 1,
wherein the at least two kinds of radical units of (b) comprises:
a second radical unit having the first electrode, the first separator, the second electrode, the second separator, the first electrode, and the first separator, which are sequentially disposed and integrally combined; and
a third radical unit having the second electrode, the second separator, the first electrode, the first separator, the second electrode, and the second separator, which are sequentially disposed and integrally combined,
wherein the cell stack part has a structure in which the second radical unit and the third radical unit are alternately disposed.

11. The electrode assembly of claim 1,
wherein the one kind of radical unit of (a) is provided in plurality and the plurality of one kind of radical units is classified into at least two groups having different sizes, and
wherein the cell stack part has a structure in which a plurality of steps is formed by stacking the one kind of radical units of (a) according to the size thereof.

12. The electrode assembly of claim 1,
wherein the one kind of radical unit of (a) is provided in plurality and the plurality of the one kind of radical units is classified into at least two groups having different geometric shapes, and
wherein the cell stack part has a structure in which a plurality of steps is formed by stacking the one kind of radical units of (a) according to the geometric shape thereof.

13. The electrode assembly of claim 1, wherein an entire surface of the electrode facing the adjacent separator is attached to the adjacent separator.

14. The electrode assembly of claim 1, wherein the attachment between the electrode and the separator is provided by applying pressure to the electrode and the adjacent separator or by applying pressure and heat to the electrode and the adjacent separator.

15. The electrode assembly of claim 1,
wherein the separator comprises a porous separator base material and a porous coating layer that is applied to an entire surface of one side or both sides of the separator base material,
wherein the porous coating layer comprises a mixture of inorganic particles and a binder polymer, wherein the binder polymer binds and fixes the inorganic particles to each other, and
wherein the electrode is attached to the adjacent separator by the coating layer.

16. The electrode assembly of claim 15,
wherein the inorganic particles of the porous coating layer have a densely packed structure to form interstitial volumes between the inorganic particles over the overall coating layer, and
wherein a pore structure is formed in the coating layer by the interstitial volumes that are defined by the inorganic particles.

17. The electrode assembly of claim 1,
wherein the cell stack part further comprises a first auxiliary unit stacked on a terminal electrode that is an uppermost or a lowermost electrode,
wherein, when the terminal electrode is a cathode, the first auxiliary unit is formed by stacking from the terminal electrode, a first separator, an anode, a second separator, and a cathode in sequence, and
wherein, when the terminal electrode is an anode, the first auxiliary unit is formed by stacking from the terminal electrode, a separator and a cathode in sequence.

18. The electrode assembly of claim 17, wherein the cathode of the first auxiliary unit comprises:
a current collector; and
an active material coated on only one side facing the radical unit among both sides of the current collector.

19. The electrode assembly of claim 1,
wherein the cell stack part further comprises a second auxiliary unit on a terminal separator that is an uppermost or a lowermost separator,
wherein, when the electrode contacting the terminal separator is a cathode in the radical unit, the second auxiliary unit is formed by stacking from the terminal separator, an anode, a separator and a cathode in sequence, and
wherein, when the electrode contacting the terminal separator is an anode in the radical unit, the second auxiliary unit is formed as a cathode.

20. The electrode assembly of claim 19, wherein the cathode of the second auxiliary unit comprises:
a current collector; and
an active material coated on only one side facing the radical unit among both sides of the current collector.

21. The electrode assembly of claim 1,
wherein the cell stack part further comprises a first auxiliary unit stacked on a terminal electrode disposed on an uppermost or a lowermost electrode,
wherein, when the terminal electrode is a cathode, the first auxiliary unit is formed by stacking from the terminal electrode, a separator and an anode in sequence, and
wherein, when the terminal electrode is an anode, the first auxiliary unit is formed by stacking from the terminal electrode, a first separator, a cathode, a second separator and an anode in sequence.

22. The electrode assembly of claim 21, wherein the first auxiliary unit further comprises a separator at an outer side of the anode.

23. The electrode assembly of claim 1,
wherein the cell stack part further comprises a second auxiliary unit on a temlinal separator that is an uppermost or a lowermost separator,
wherein, when the electrode contacting the terminal separator is a cathode in the radical unit, the second auxiliary unit is formed as an anode, and
wherein, when the electrode contacting the terminal separator is an anode in the radical unit, the second auxiliary unit is formed by stacking from the terminal separator, a cathode, a separator, and an anode in sequence.

24. The electrode assembly of claim 23, wherein the second auxiliary unit further comprises a separator at an outer side of the anode.

25. The electrode assembly of claim 1,
wherein the cell stack part further comprises a second auxiliary unit stacked on a terminal separator that is an uppermost or a lowermost separator, and
wherein, when the electrode contacting the terminal separator in the radical unit is an anode, the second auxiliary unit is formed by stacking from the terminal separator, a first cathode, a first separator, an anode, a second separator, and a second anode in sequence.

26. The electrode assembly of claim 25, wherein the second cathode of the second auxiliary unit comprises:
a current collector; and
an active material coated on only one side facing the radical unit among both sides of the current collector.

27. The electrode assembly of claim 1,
wherein the cell stack part further comprises a second auxiliary unit stacked on a terminal separator that is an uppermost or a lowermost separator, and
wherein, when the electrode contacting the terminal separator is a cathode in the radical unit, the second auxiliary unit is formed by stacking from the terminal separator, a first anode, a first separator, a cathode, a second separator, and a second anode in sequence.

* * * * *